(12) United States Patent
Larson

(10) Patent No.: US 9,903,425 B2
(45) Date of Patent: Feb. 27, 2018

(54) POSITIVE MECHANICAL ROTARY LOCK

(71) Applicant: Moog Inc., East Aurora, NY (US)

(72) Inventor: Lowell Van Lund Larson, Huntington Beach, CA (US)

(73) Assignee: Moog Inc., East Aurora, NY (US)

( * ) Notice: Subject to any disclaimer, the term of this patent is extended or adjusted under 35 U.S.C. 154(b) by 400 days.

(21) Appl. No.: 14/839,998

(22) Filed: Aug. 30, 2015

(65) Prior Publication Data

US 2017/0059019 A1    Mar. 2, 2017

(51) Int. Cl.
*F16D 63/00* (2006.01)

(52) U.S. Cl.
CPC ................. *F16D 63/006* (2013.01)

(58) Field of Classification Search
CPC ....... F16D 63/006; F16D 59/00; F16D 63/004
See application file for complete search history.

(56) References Cited

U.S. PATENT DOCUMENTS

| | | | |
|---|---|---|---|
| 1,125,935 A | 1/1915 | Bendix | |
| 1,172,864 A | 2/1916 | Bendix | |
| 1,327,132 A | 1/1920 | Bendix | |
| 2,093,638 A * | 9/1937 | La Brie | F16D 55/31 188/140 R |
| 2,157,588 A * | 5/1939 | Brewer | B60W 10/02 188/152 |
| 2,192,439 A | 3/1940 | Gustafson | |
| 2,967,596 A | 1/1961 | Page | |
| 3,242,759 A * | 3/1966 | Magg | F16H 63/20 74/473.25 |
| 3,264,893 A * | 8/1966 | Stott | F16H 59/042 74/104 |
| 3,688,880 A * | 9/1972 | Lewis | F16H 63/18 192/215 |
| 4,759,233 A * | 7/1988 | Woodbridge | B60K 17/3465 475/231 |
| 4,820,210 A * | 4/1989 | Dretzka | B63H 21/28 192/51 |
| 6,032,418 A | 3/2000 | Larson | |
| 6,418,666 B1 * | 7/2002 | Pfanzer | E05F 15/622 49/324 |
| 7,240,758 B2 * | 7/2007 | Korenjak | F01B 1/12 180/292 |
| 9,415,857 B2 * | 8/2016 | Fox | B64C 23/072 |
| 2010/0038193 A1 | 2/2010 | D'Amore | |

* cited by examiner

*Primary Examiner* — David M Fenstermacher
(74) *Attorney, Agent, or Firm* — Hodgson Russ LLP

(57) ABSTRACT

A rotary lock apparatus comprises a structural ground and a shaft rotatable about a shaft axis relative to the structural ground, wherein the shaft includes a detent portion. First and second locking components are displaceable along the shaft axis in opposite directions to cause the detent portion to be engaged and coupled to the structural ground in a manner preventing rotation of the shaft about the shaft axis. The locking components are actuated through a combined displacement distance and are configured such that at least one of the first and second locking components positively causes the shaft to be engaged and coupled to the structural ground to thereby lock the shaft against rotation.

21 Claims, 17 Drawing Sheets

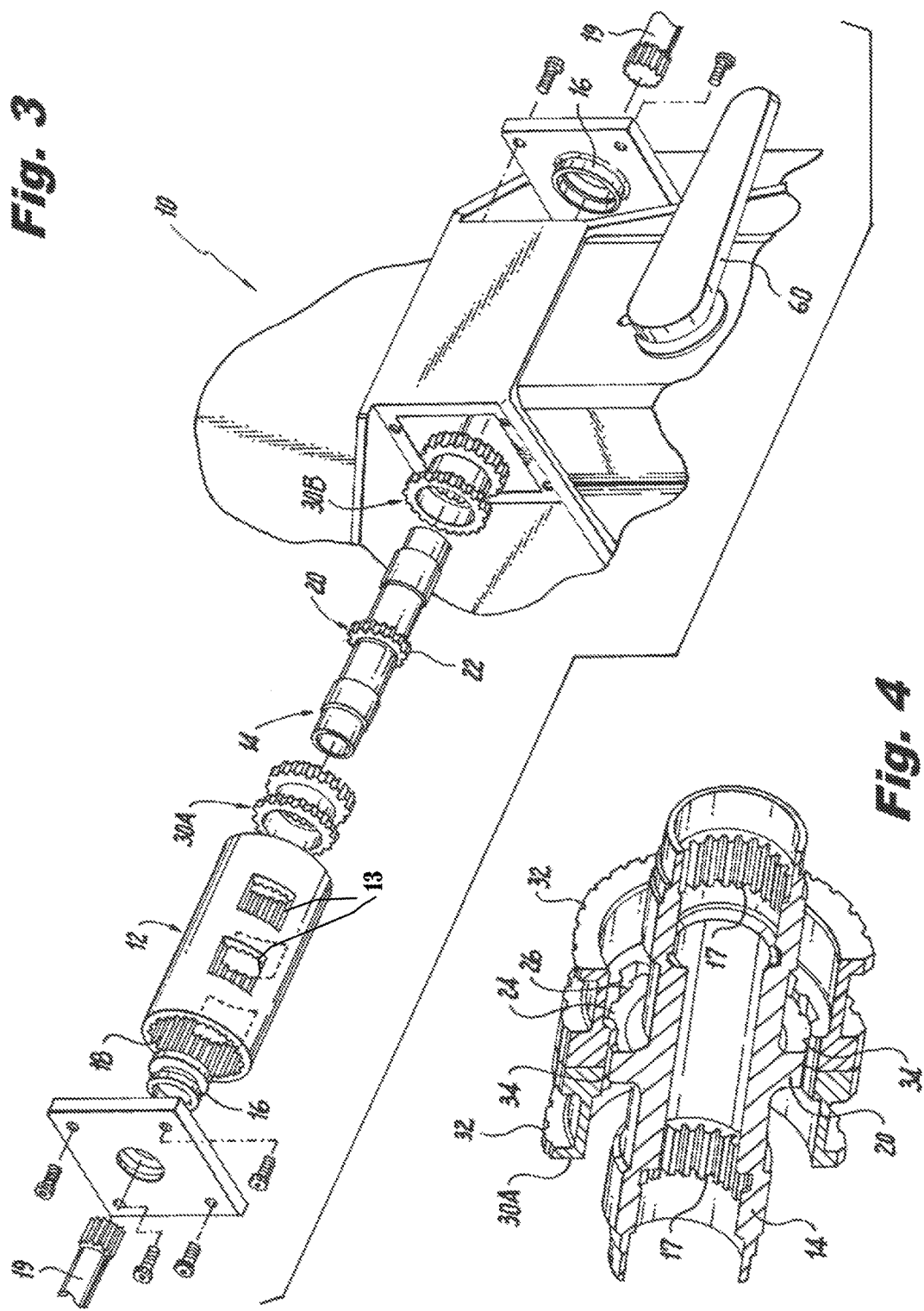

POSITIVE MECHANICAL ROTARY LOCK

FIELD OF THE INVENTION

The present invention relates generally to locking mechanisms for positively locking a rotary shaft against rotation relative to a structural ground.

BACKGROUND OF THE INVENTION

A common mechanism for locking a shaft against rotation relative to a structural ground includes a pawl coupled to the structural ground and biased for radially directed insertion into a gap between two gear teeth on the shaft, wherein the pawl to radially engages one gear tooth on the shaft. A disadvantage of this type of locking mechanism is that it requires a radially directed load on the pawl that is transmitted through the shaft and opposed by the rotary bearings supporting the shaft. These loads may reduce the reliability of the components within the locking mechanism. Another disadvantage is that the pawl is not always in line with a gap between two gear teeth, so it is not always in proper alignment for full locking engagement. The shaft must continue to rotate until proper alignment is achieved, or the single radially engaging pawl might sit on the tip of a tooth, thereby giving false indication of a full lock.

It is also known to provide an automatic engagement device, for example a Bendix drive "twisting" clutch, whereby a tooth that is fixed rotationally relative to structural ground is axially pushed into meshing engagement with a gear on the rotating shaft. This type of locking mechanism has the problem that the gear on the rotating shaft will sometimes rotate around with the re-indexing nature of the Bendix action and not go into meshing engagement with the rotationally fixed braking tooth.

Another common mechanism for locking a shaft against rotation relative to a structural ground is an axially sliding spline configured to lock all of the teeth on the rotating shaft at once, or an axially sliding clutch-half configured to mate with a corresponding clutch half on the shaft. Examples of axial coupling mechanisms include a synchromesh clutch, a Bendix clutch, and a face gear clutch. The synchromesh clutch uses a sliding collar which is pushed axially to lock two shafts together. A Bendix clutch has a helical screw alignment device for axially pushing a fixed tooth into meshing engagement with a rotatable gear on the rotating shaft. A face gear clutch has teeth or dogs on the face of two clutch halves that mesh when the two clutch halves are pushed axially together. A disadvantage of these axial engagement mechanisms is that all of the teeth are required to engage for a lock, so the shaft might continue to rotate relative to the axially sliding spline due to improper alignment and not engage on the first try.

What is needed is a rotary lock apparatus that guarantees positive engagement of a rotary shaft for stopping shaft rotation relative to a structural ground, and that does not result in undue loading on the mechanical components.

SUMMARY OF THE INVENTION

The invention provides a rotary lock apparatus configured to positively lock a shaft against rotation without applying a radially directed load on the shaft or rotary bearings supporting the shaft.

The rotary lock apparatus comprises a structural ground and a shaft rotatable about a shaft axis relative to the structural ground, wherein the shaft includes a detent portion. The apparatus further comprises a first locking component displaceable along the shaft axis to cause the detent portion of the shaft to be engaged and coupled to the structural ground in a manner preventing rotation of the shaft about the shaft axis, and a second locking component displaceable along the shaft axis to cause the detent portion of the shaft to be engaged and coupled to the structural ground in a manner preventing rotation of the shaft about the shaft axis. The rotary lock apparatus has an actuating means for displacing the first locking component and the second locking component along the shaft axis in opposite axial directions through a combined displacement distance such that at least one of the first and second locking components positively causes the shaft to be engaged and coupled to the structural ground to thereby lock the shaft against rotation about the shaft axis relative to the structural ground. When the first locking component is prevented from causing the detent portion of the shaft to be engaged, the actuating means increases displacement of the second locking component along the shaft axis to achieve the combined displacement distance. Similarly, when the second locking component is prevented from causing the detent portion of the shaft to be engaged, the actuating means increases displacement of the first locking component to achieve the combined displacement distance.

In a first embodiment, the actuating means includes a cam-actuated scotch yoke mechanism driving a pair of displacement arms respectively coupled to the first and second locking components. In a second embodiment, the actuating means includes a threaded adjustment member, such as a turnbuckle or a jack screw, arranged on the shaft axis to directly drive the first and second locking components. In a third embodiment, the actuating means includes a threaded adjustment member, such as a turnbuckle or a jack screw, arranged between first and second displacement arms respectively coupled to the first and second locking components.

The detent portion may be an externally splined portion of the shaft, and the first and second locking components may be ring-shaped components each having an internal spline for meshing with the detent portion spline and an external spline meshed with an internal spline of the structural ground. Alternatively, the detent portion may have an array of radial ball-receiving recesses, and the first and second locking components may cooperate with a grounded ball collar retaining first and second arrays of balls such that axial displacement of the first and second locking components forces the first and second ball arrays into the recesses to couple the shaft to the structural ground by way of the ball collar. The detent portion may be a single axially continuous portion of the shaft located between the two locking components, wherein the locking components are moved toward one another along the shaft axis to cause locking. Alternatively, the detent portion may be an axially discontinuous portion of the shaft having a pair of detent subportions located on opposite sides of the first and second locking components, wherein the locking components are moved away from one another along the shaft axis to cause locking.

BRIEF DESCRIPTION OF THE DRAWING VIEWS

The nature and mode of operation of the present invention will now be more fully described in the following detailed description of the invention taken with the accompanying drawing figures, in which:

FIG. 3 is an exploded view of locking components of the rotary lock apparatus shown in FIG. 1;

FIG. 4 is a sectioned perspective view of a shaft and locking components of the rotary lock apparatus shown in FIG. 1;

DETAILED DESCRIPTION OF THE INVENTION

Figure 1:
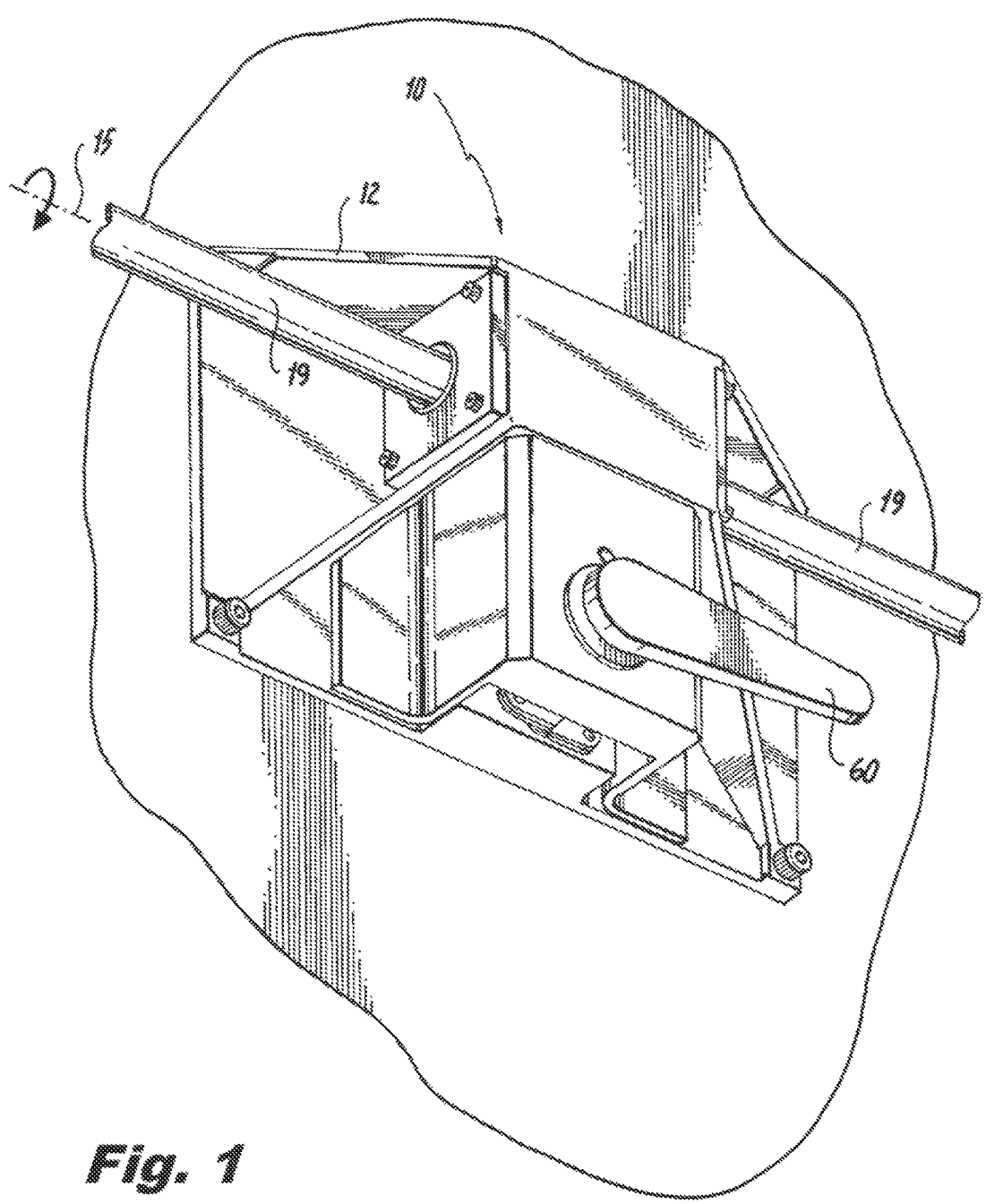
FIG. 1 is a perspective view of a rotary lock apparatus formed in accordance with a first embodiment of the present invention.
Figure 2:
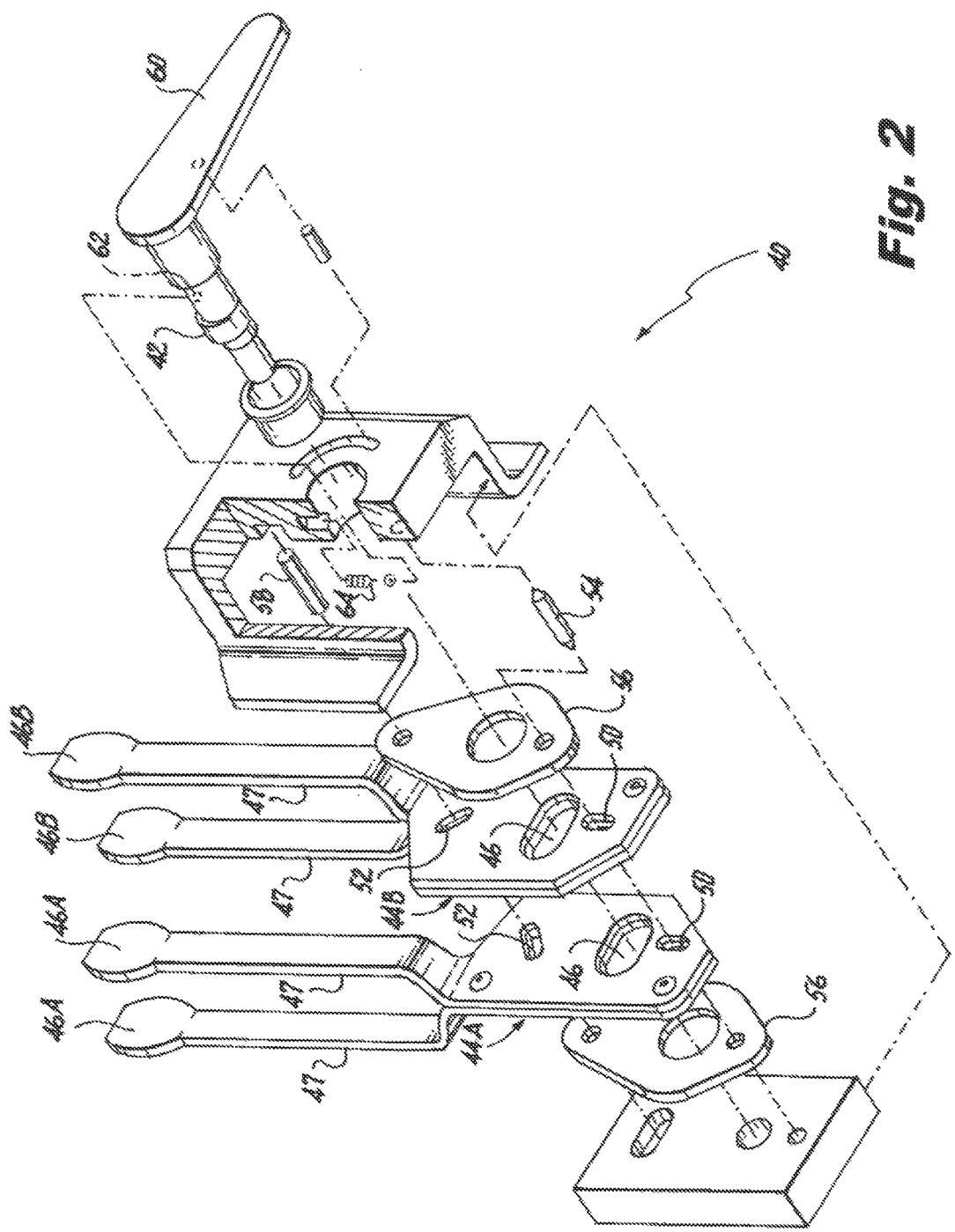
FIG. 2 is an exploded view of actuating components of the rotary lock apparatus shown in FIG. 1.
Figure 5:
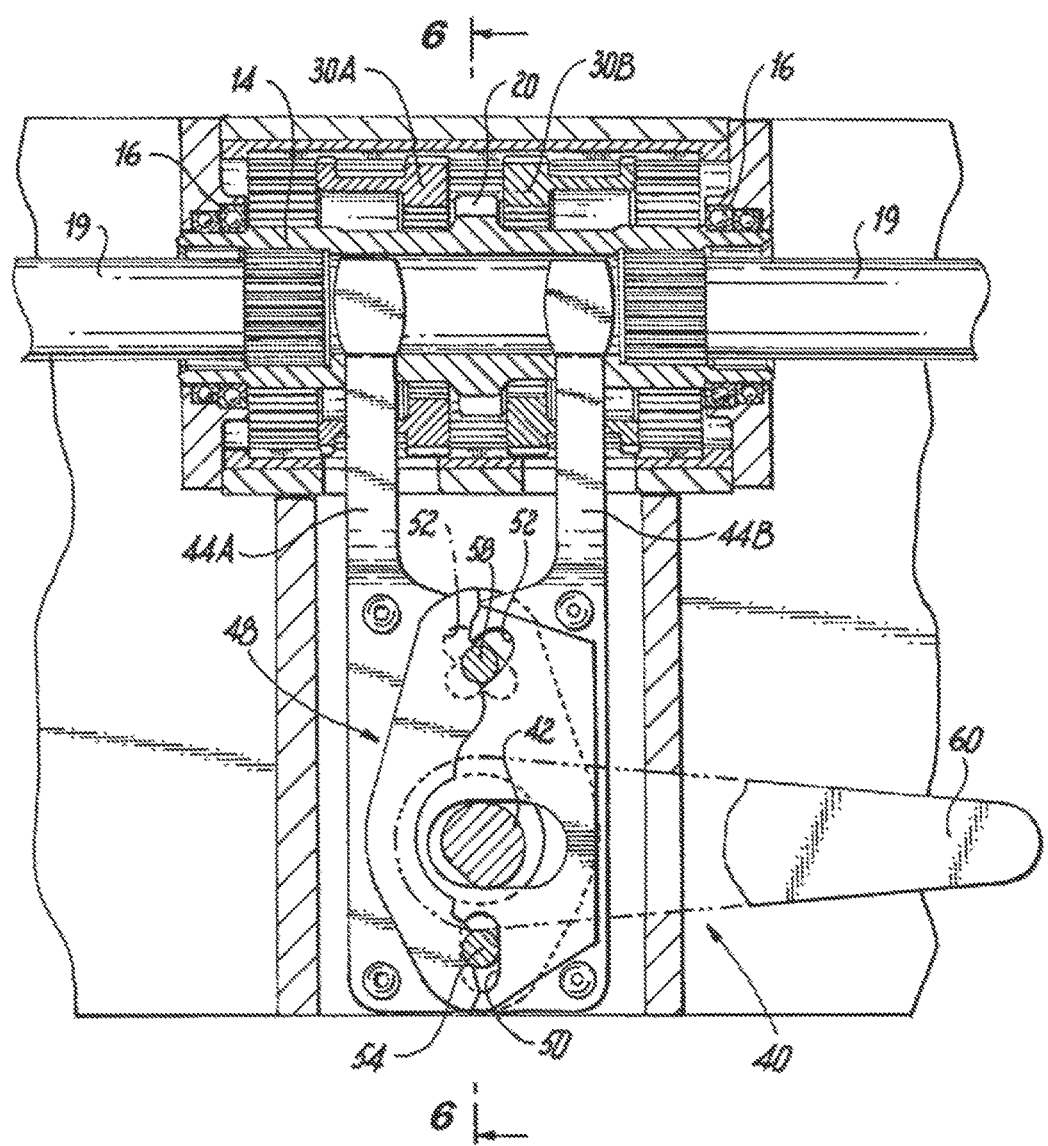
FIG. 5 is a partially sectioned front view of the rotary lock apparatus shown in FIG. 1.
Figure 6:
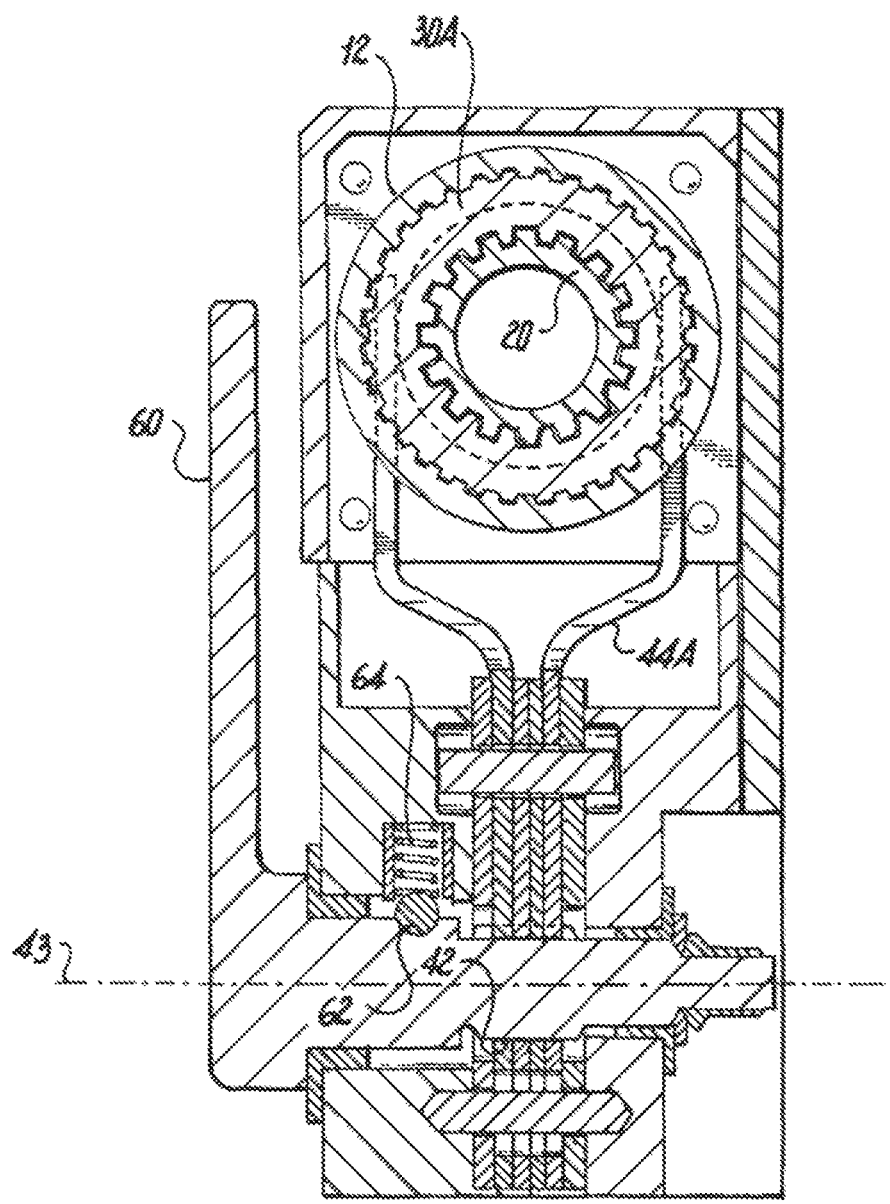
FIG. 6 is a cross-sectional side view of the rotary lock apparatus shown in FIG. 1, taken generally along the line 6-6 in FIG. 5.

FIGS. 1-9 illustrate a rotary lock apparatus 10 formed in accordance with a first embodiment of the present invention. Rotary lock apparatus 10 comprises a structural ground 12 and a shaft 14 rotatable about a shaft axis 15 relative to the structural ground 12. The structural ground 12 is shown in the form of a housing including a cylindrical tube, and shaft 14 is mounted to extend through the housing by a pair of rotary bearings 16 such that shaft 14 is free to rotate relative to the housing when rotary lock apparatus 10 is in an unlocked state. As will be understood from description that follows, shaft 14 may be prevented from rotating relative to structural ground 12 when rotary lock apparatus 10 is placed in a locked state. The exact form of structural ground 12 is subject to wide variation and may differ from the housing shown in FIGS. 1-9. Structural ground 12 may include an internal spline 18.

Shaft 14 may also vary in form. For example, shaft 14 may be hollow and may include internal splines 17 for coupling other shafts 19 for rotation with shaft 14. Alternatively, shaft 14 may be solid. Shaft 14 includes a detent portion 20 that may be engaged to lock shaft 14 against rotation relative to structural ground 12. In the depicted embodiment, detent portion 20 is axially centered at line 21. Detent portion 20 includes an external spline 22 having of a plurality of spline teeth 24 and gaps 26. For example, detent portion 20 may be a standard toothed spline having every other tooth removed to angularly enlarge the gaps 26.

Rotary lock apparatus 10 further comprises a first locking component 30A and a second locking component 30B. As best seen in FIGS. 3, 4 and 7-9, first and second locking components 30A, 30B may be ring-shaped components arranged coaxially with shaft 14 in mirror image on opposite sides of detent portion 20. In the current embodiment, each locking component 30A, 30B includes an external spline 32 meshed with the internal spline 18 of structural ground 12. Consequently, first and second locking components 30A, 30B are constrained from rotating about shaft axis 15 by structural ground 12, but are independently displaceable along shaft axis 15. Each locking component 30A, 30B further includes an internal spline 34 configured for meshing engagement with external spline 22 of detent portion 20 to prevent rotation of shaft 14 about shaft axis 15 relative to structural ground 12. For example, internal spline 34 may be a standard toothed spline having every other tooth removed and sized to mesh with external spline 22 of detent portion 20.

Rotary lock apparatus 10 also comprises an actuating means, generally designated by reference numeral 40, for displacing the first locking component 30A and the second locking component 30B along shaft axis 15 in opposite axial directions through a combined displacement distance such that at least one of the first and second locking components positively meshes with detent portion 20, causing the shaft 14 to be engaged and coupled to structural ground 12 to thereby lock shaft 14 against rotation about shaft axis 15 relative to the structural ground. As used herein, the term "combined displacement distance" refers the total distance the first and second locking components 30A, 30B are displaced along shaft axis 15 by actuating means 40, regardless of displacement direction. For example, the first and second locking components 30A, 30B may each be displaced individually, and in opposite directions, through one-half the "combined displacement distance." As another example, the first locking component 30A may be displaced through the entire "combined displacement distance" while the second locking component 30B undergoes zero displacement. As yet another example, the first locking component 30A may undergo zero displacement while the second locking component is displaced through the entire "combined displacement distance."

In the first embodiment shown in FIGS. 1-9, actuating means 40 is conceptually similar to a scotch yoke mechanism. Actuating means 40 of the first embodiment includes an eccentric drive cam 42 rotatable about a cam axis 43, and first and second displacement arms 44A, 44B engaged by drive cam 42. For example, each displacement arm 44A, 44B may have a respective cam slot 46 receiving drive cam 42, wherein an upper edge of each cam slot 46 is engaged by eccentric drive cam 42. First displacement arm 44A has an output end 46A coupled to first locking component 30A, and second displacement arm 44B has an output end 46B coupled to the second locking component 30B. Actuating means 40 of the first embodiment also includes a linkage 48 connecting first displacement arm 44A and the second displacement arm 44B, wherein rotation of drive cam 42 about cam axis 43 moves the first and second displacement arms 44A, 44B relative to cam axis 43, and linkage 48 causes relative movement between the respective output ends 46A, 46B of first and second displacement arms 44A, 44B along shaft axis 15. More specifically, the first displacement arm 44A and the second displacement arm 44B may each include a respective primary travel slot 50 extending in a direction perpendicular to cam axis 43 and a respective secondary travel slot 52 extending in an inclined direction relative to the direction of primary travel slot 50. The respective secondary slots 52 of first displacement arm 44A and second displacement arm 44B may extend in oppositely inclined directions relative to the direction of the primary travel slots 50, thereby overlapping to form a generally X-shaped configuration centered along line 21. Linkage 48 may include a link pivot pin 54 fixed relative to structural ground 12 and received by the primary travel slots 50 of the first and second displacement arms 44A, 44B, a link member 56 pivotable about a pivot axis defined by the link pivot pin 54, and a follower pin 58 mounted on link member 56 at a location spaced from the pivot axis and received by the secondary travel slots 52 of the first and second displacement arms 44A, 44B.

First locking component 30A and second locking component 30B may each include a respective circumferential groove 36, and the output ends 46A, 46B of the first and second displacement arms 44A, 44B may form a yoke having bifurcated yoke arms 47 terminating in a respective pair of yoke pads 49 slidably retained in circumferential groove 36 of the associated locking component 30A or 30B. In this manner, the yokes may remain mated with grooves 36 during generally arcuate motion of output ends 46A, 46B (described below) and corresponding axial displacement of first and second locking components 30A, 30B. The bifurcated yoke arms may extend through access slots 13 in structural ground 12.

In the depicted embodiment, a lever 60 is connected to eccentric drive cam 42 for manually rotating the drive cam about cam axis 43. Cam axis 43 may be parallel to the pivot axis of link member 56 defined by link pivot pin 54, however other cam configurations are possible, including configurations wherein the rotational axis of the cam is not parallel to the pivot axis of link member 56. While actuating means 40 described above utilizes eccentric cam 42 to drive reciprocating motion of first and second displacement arms 44A, 44B, another reciprocating drive mechanism may be substituted for eccentric cam 42. For example, lever 60 may be a rotatable crank handle connected to first and second displacement arms 44A, 44B by a pivotally mounted link imparting motion to first and second displacement arms 44A, 44B when the handle is rotated. Lever 60 may include a pair of recesses 62 spaced angularly about cam axis 42 to respectively correspond to unlocked and locked states of rotary lock apparatus 10, and a ball plunger 64 may be mounted in structural ground 12 for biased engagement into a given recess 62, thereby providing tactile and audible feedback to a user operating lever 60 indicating that an unlocked or locked state has been reached.

Those skilled in the art will readily appreciate that a motor (not shown) may be connected to drive cam 42 for rotating the drive cam in automated fashion. Likewise, if a crank-and-link mechanism or other drive mechanism is used, it may be motorized without straying from the invention.

Figure 7:
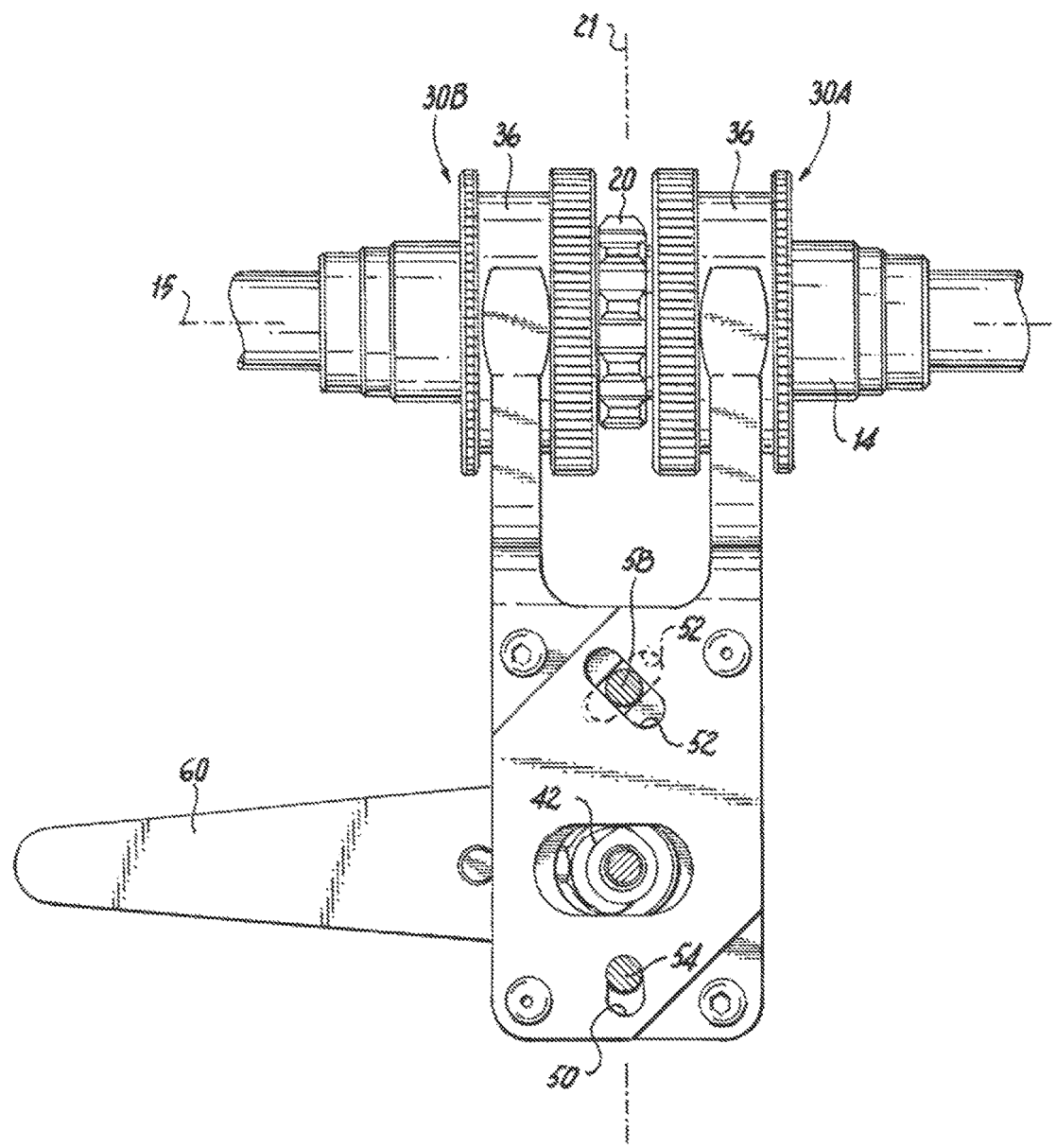
FIG. 7 is a schematic rear elevation view of the rotary lock apparatus shown in FIG. 1, wherein the apparatus is in an unlocked state.
Figure 8:
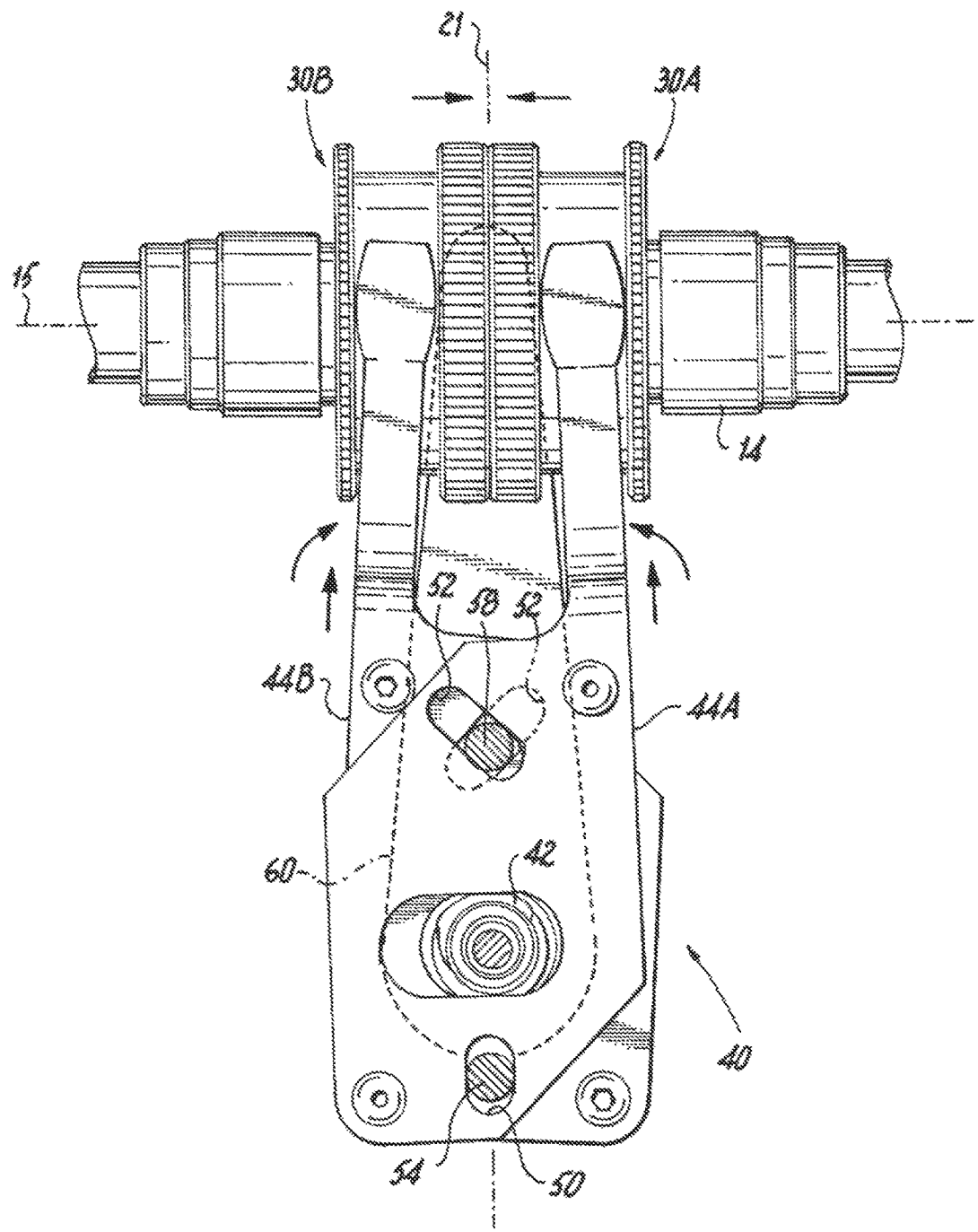
FIG. 8 is view similar to that of FIG. 7, wherein the apparatus is in a locked state.
Figure 9:
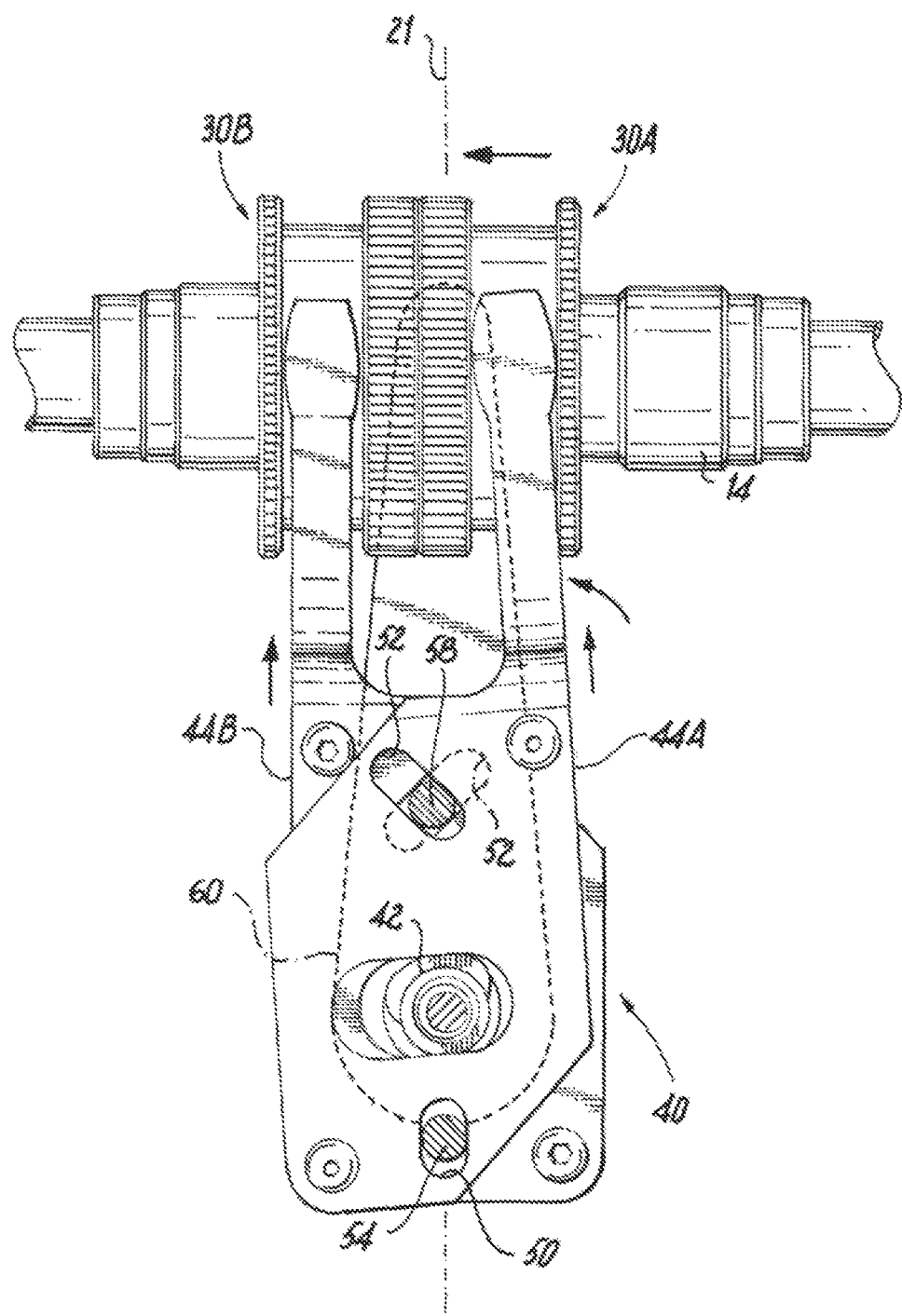
FIG. 9 is view similar to that of FIG. 7, wherein the apparatus is in an alternative locked state.

Operation of actuating means 40 of the first embodiment will now be described with reference to FIGS. 7-9. In FIG. 7, rotary lock apparatus 10 is in an unlocked state wherein first and second locking components 30A, 30B are not in meshed engagement with detent portion 20, and shaft 14 is free to rotate about shaft axis 15. In the unlocked state of rotary lock apparatus 10, lever 60 may be in a horizontal orientation extending parallel to shaft axis 15 as shown in FIG. 7. When lever 60 is rotated ninety degrees about cam axis 43, drive cam 42 is rotated in the same manner and an eccentric lobe portion of drive cam 42 forces first and second displacement arms 44A, 44B upward relative to cam axis 43 and link pivot pin 54. As may be understood, first and second displacement arms 44A, 44B are permitted to travel upward by elongated primary travel slots 50 through which link pivot pin 54 extends. Simultaneously with the upward movement of first and second displacement arms 44A, 44B, follower pin 58 engages with crossed secondary travel slots 52, guiding first and second displacement arms 44A, 44B to pivot in opposite directions about link pivot pin 54. As a result, the respective output ends 46A, 46B of first and second displacement arms 44A, 44B move toward one another along shaft axis 15 in symmetrical fashion about center line 21, thereby displacing first and second locking components 30A, 30B toward one another. As shown in FIG. 8, both locking components 30A, 30B enter into meshed engagement with detent portion 20 and meet one another at center line 21. Thus, first locking component 30A moves half of the combined displacement distance in one direction, and second locking component 30B moves half of the combined displacement distance in the opposite direction. Because the external splines 32 of first and second locking components 30A, 30B are meshed with internal spline 18 of structural ground (not shown in FIGS. 7-9), shaft 14 is locked against rotation about shaft axis relative to structural ground 12.

Depending upon the instantaneous rotational position of shaft 14 as it rotates about axis 15, second locking component 30B may sometimes be prevented from sliding axially into meshing engagement with detent portion 20 of shaft 14. This occurs when teeth of spline 34 are not aligned with gaps 26 of spline 22 and abut against teeth 24 of spline 22. This situation is illustrated in FIG. 9. When this happens, actuating means 40 automatically increases displacement of first locking component 30A along shaft axis 15 to achieve the combined displacement distance. As may be understood, second displacement arm 44B is prevented from pivoting about link pivot pin 54 and cannot be guided by movement of its secondary travel slot 52 along follower pin 58. However, follower pin 58 is permitted to move along the secondary travel slot 52 of second displacement arm 44B because follower pin 58 is mounted on link member 56 which pivots slightly about the pivot axis defined by link pivot pin 54. The pivoting motion of link member 56 causes first displacement arm 44A to pivot further than it normally would about link pivot pin 54, thereby increasing the axial displacement of first locking component 30A. Consequently, when second locking component 30B is prevented from moving axially, first locking component 30A is displaced along shaft axis 15 by the entire combined displacement distance.

As will be understood, actuating means 40 operates in an opposite manner when first locking component 30A is prevented from engaging detent portion 20 of shaft 14. When this occurs, actuating means 40 increases displacement of second locking component 30B to achieve the combined displacement distance.

In order to preclude the possibility that first and second locking components 30A, 30B are both prevented from engaging detent portion 20 at the same instant, the teeth of respective internal splines 34 on first and second locking components 30A, 30B may be angularly offset from one another about shaft axis 15. The offset angle may be chosen such that when shaft 14 is in a rotational position in which spline teeth 24 of detent portion 20 interfere with internal spline teeth on first locking component 30A, the internal spline teeth on second locking component 30B will be aligned with gaps 26 and will engage.

As will be appreciated, actuating means 40 is operable in a reverse manner to change rotary lock apparatus 10 from a locked state to an unlocked from a locked state by reversing displacement of first locking component 30A and second locking component 30B such that detent portion 20 is disengaged and decoupled from structural ground 12, whereby shaft 14 is released to permit rotation of the shaft about shaft axis 15 relative to the structural ground.

The first embodiment described above may be modified such that first and second locking components 30A, 30B cause detent portion 20 of shaft 14 to be engaged and coupled to structural ground 12 in a different way. In the configuration described above, first and second locking components 30A, 30B are part of the mechanical connection between shaft 14 and structural ground 12 that stops rotation of the shaft. However, first and second locking components 30A, 30B may cause detent portion 20 of shaft 14 to be engaged and coupled to structural ground 12 without becoming part of the mechanical connection between shaft 14 and structural ground 12. For example, as will now be described with reference to FIGS. 10-16, axial displacement of first and second locking components 30A, 30B by actuating means 40 may actuate other mechanical components that engage detent portion 20 to couple shaft 14 to the fixed structural ground.

Figure 10:
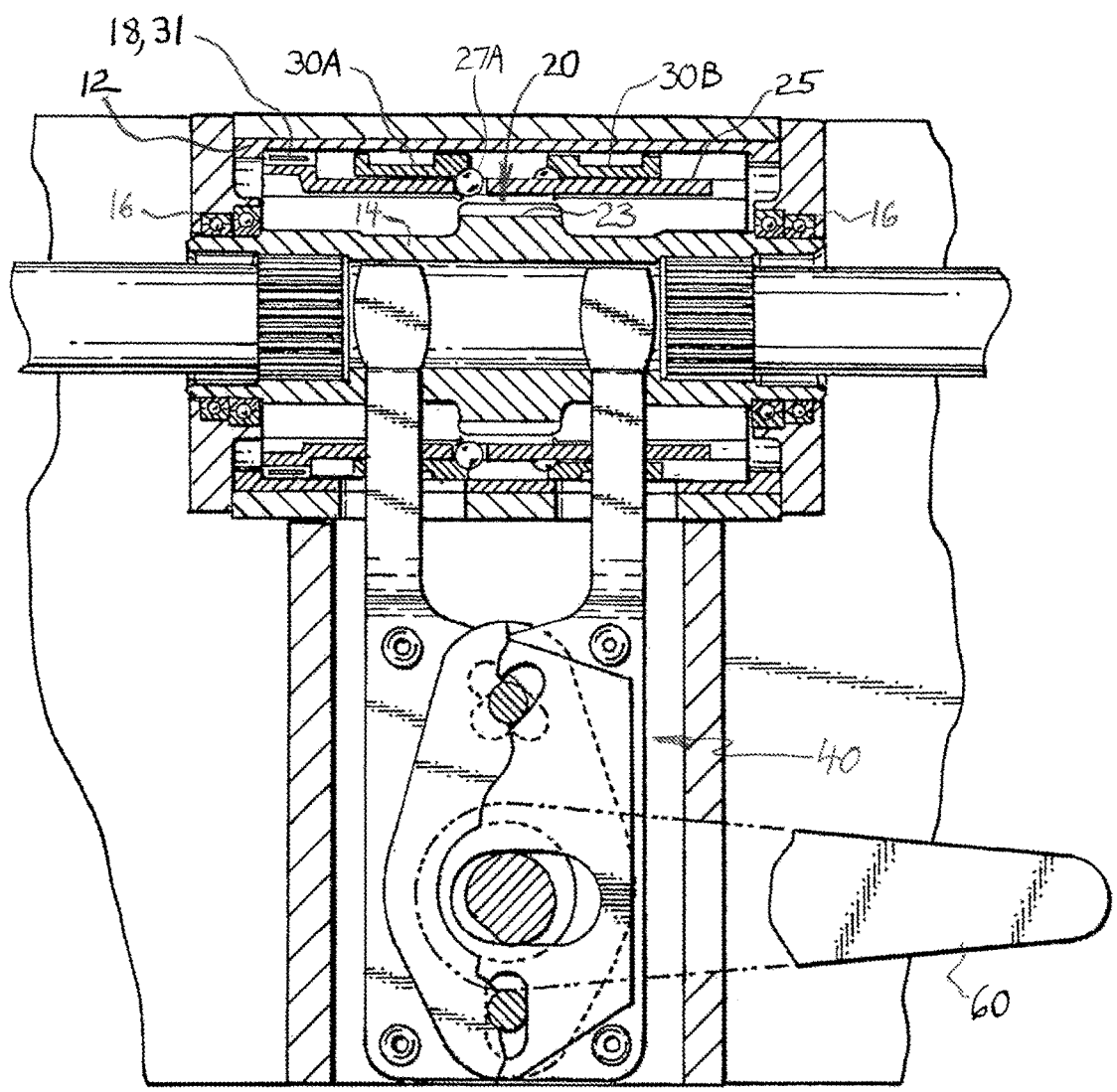
FIG. 10 is a partially sectioned front view of a modified version of the rotary lock apparatus of the first embodiment that uses a ball collar locking mechanism.
Figure 11:
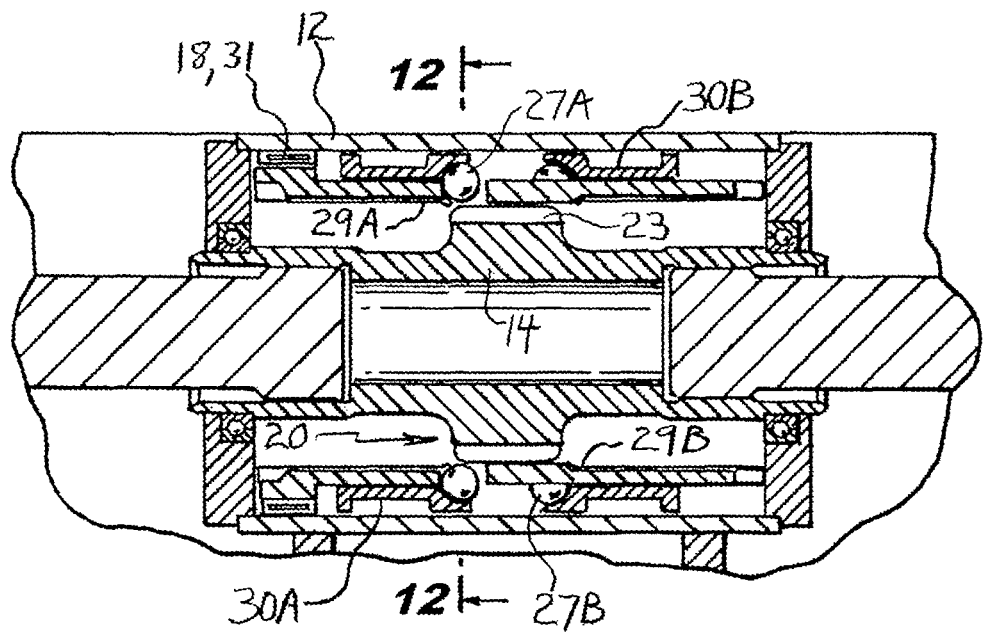
FIG. 11 is a cross-sectional view of a shaft region of the rotary lock apparatus shown in FIG. 10, with some parts omitted for clarity, wherein the rotary lock apparatus is in an unlocked state.
Figure 12:
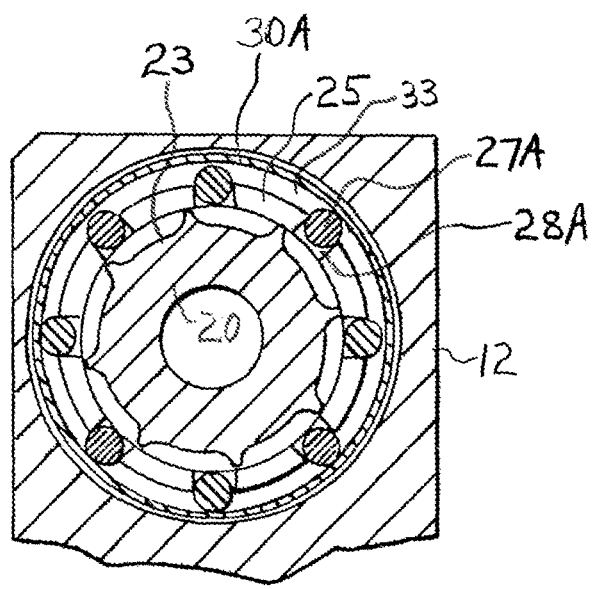
FIG. 12 is a cross-sectional view taken generally along the line 12-12 in FIG. 11.
Figure 13:
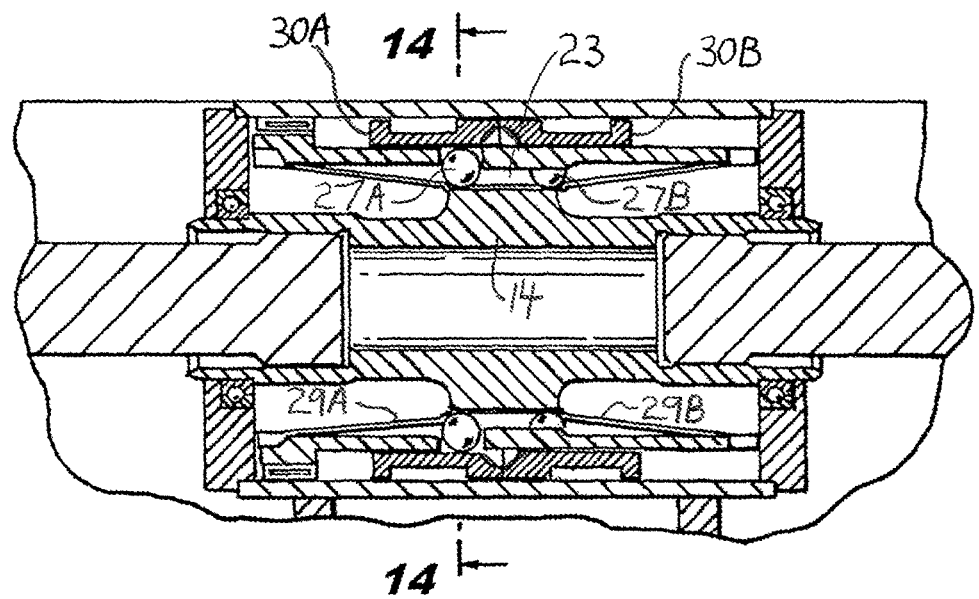
FIG. 13 is a view similar to that of FIG. 11, however the rotary lock apparatus is shown in a locked state.
Figure 14:
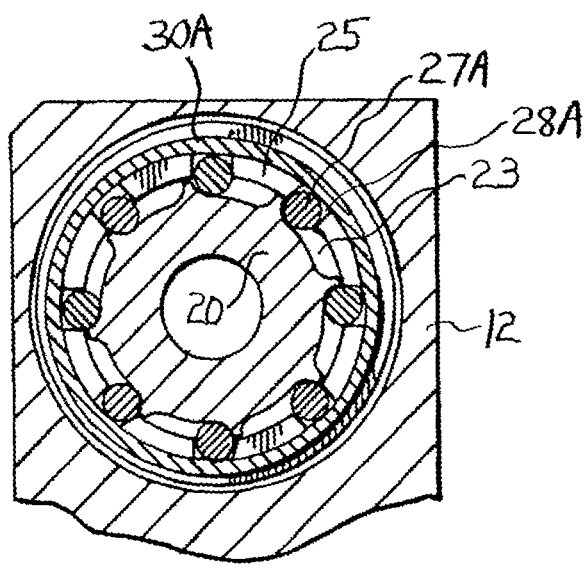
FIG. 14 is a cross-sectional view taken generally along the line 14-14 in FIG. 13.

In the arrangement of FIGS. 10-16, detent portion 20 of shaft 14 includes an array of radial ball-receiving recesses 23, and rotary lock apparatus 10 further comprises a cylindrical ball collar 25 constrained from rotating about shaft axis 15 relative to structural ground 12, wherein the cylindrical ball collar 25 has a first array of balls 27A retained in ball holes 28A and a second array of balls 27B retained in ball holes 28B. Ball collar 25 may be constrained from rotating about shaft axis 15 by meshing of an external spline 31 on the ball collar with internal spline 18 of structural ground 12. The balls in the first and second arrays 27A, 27B are spring-biased by respective leaf-spring arrays 29A, 29B associated with ball collar 25 so the balls reside at a resting radius relative to shaft axis 15 at which the balls are not received by ball-receiving recesses 23 and do not interfere with rotation of shaft 14 about shaft axis 15; this condition is illustrated in FIGS. 10-12. First and second locking components 30A, 30B each include a beveled lip 33 facing first and second ball arrays 27A, 27B, respectively. Displacement of first locking component 30A along shaft axis 15 toward detent portion 20 forces the first array of balls 27A radially inward against the spring bias of leaf-spring array 29A partially into ball-receiving-recesses 23 to engage detent portion 20. Likewise, displacement of second locking component 30B along shaft axis 15 toward detent portion 20 forces the second array of balls 27B radially inward against the spring bias of leaf-spring array 29B partially into ball-receiving-recesses 23 to engage detent portion 20. Thus, axial displacement of first and second locking components 30A, 30B causes detent portion 20 to be engaged and coupled to ball collar 25, which is constrained from rotating about shaft axis 15 relative to structural ground 12. Consequently, as shown in FIGS. 13 and 14, shaft 14 is coupled to the fixed structural ground 12 and can no longer rotate about shaft axis 15.

Figure 15:
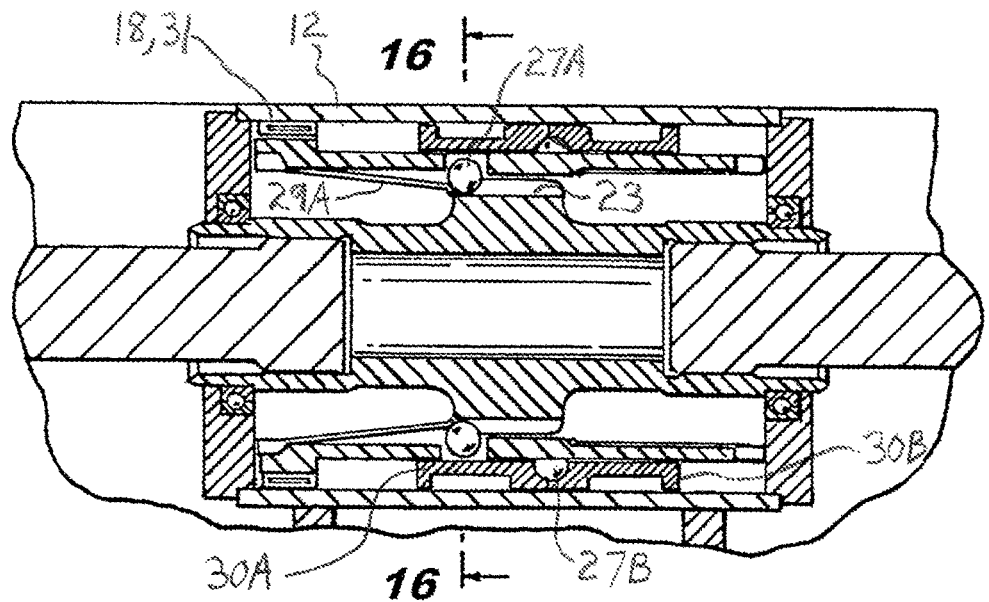
FIG. 15 is a view similar to that of FIG. 11, however the rotary lock apparatus is shown in an alternative locked state.
Figure 16:
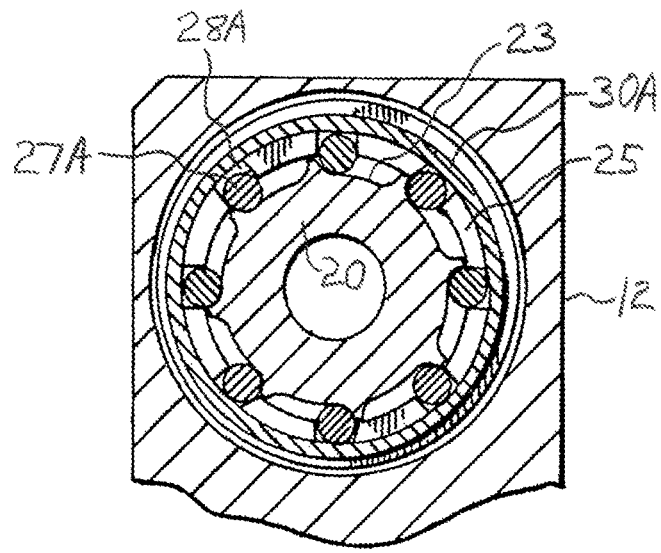
FIG. 16 is a cross-sectional view taken generally along the line 16-16 in FIG. 15.

As may be understood, if a ball array 27A or 27B is not radially aligned with ball-receiving recesses 23 of detent portion 20 at a given rotational position of shaft 14, the corresponding locking component 30A or 30B will be prevented from moving axially by abutment of the balls against segments between recesses 23 of detent portion 20. To prevent both locking components 30A, 30B from simultaneously failing to cause engagement, first array of balls 27A and second array of balls 27B may be angularly offset from one another about shaft axis 15 such that at least one of the first and second arrays of balls is aligned for receipt into ball-receiving recesses 23 of detent portion 20 at any given rotational position of shaft 14. For example, as shown in FIGS. 15 and 16, the locking component 30A associated with properly aligned ball array 27A is moved by the entire combined displacement distance and locking positively occurs despite the nonalignment of second ball array 27B.

The modification using a ball collar 25 offers an alternative to splined locking components that may be used for applications in which it is desirable to be able to unlock shaft 14 by applying a torque to the shaft that is sufficient to cause the ball arrays 27A or 27B to become disengaged from ball-receiving recesses 23.

Reference is now made to FIGS. 17-20 depicting a rotary lock apparatus 110 formed in accordance with a second embodiment of the present invention. The second embodiment differs from the first embodiment in the arrangement of detent portion 20 and locking components 30A, 30B. In the first embodiment described above, detent portion 20 is an axially continuous portion of shaft 14 having an axial center at center line 21, and the first and second locking components are arranged on opposite axial sides of detent portion 20 in the unlocked state. In the second embodiment, detent portion 20 is an axially discontinuous portion of shaft 14 defining a first detent subportion 20A and a second detent subportion 20B axially spaced apart from the first detent subportion and centered about center line 21, wherein first locking component 30A and second locking component 30B are arranged axially between first detent subportion 20A and second detent subportion 20B. Therefore, in the second embodiment, first and second locking components 30A, 30B are displaced away from one another instead of toward one another along shaft axis 15 to cause engagement and coupling of shaft 14 to structural ground 12. In the context of this specification, "detent portion" broadly means both an axially continuous portion and an axially discontinuous portion.

Rotary lock apparatus 110 of the second embodiment also differs from rotary lock apparatus 10 of the first embodiment with respect to the type of actuating means employed. Rotary lock apparatus 110 of the second embodiment has an actuating means 140 comprising a threaded adjustment member 142 connecting first locking component 30A and second locking component 30B, wherein threaded adjustment member 142 is rotatable about a screw axis 143 in a first rotational direction to displace first and second locking components 30A, 30B toward one another along shaft axis 15, and threaded adjustment member 142 is rotatable about screw axis 143 in a second rotational direction opposite the first rotational direction to displace first and second locking components 30A, 30B away from one another along the shaft axis 15. As will be explained in greater detail below, threaded adjustment member 142 is itself movable along screw axis 143. As used herein, the term "threaded adjustment member" broadly encompasses members having traditional screw threads, helical splines, helical channels and slots, ball screw threads having a helical raceway for ball bearings, and other arrangements for converting rotational motion to linear motion. For sake of simplicity, the present disclosure depicts threaded adjustment members having traditional screw threads and makes reference to "screw threads," however those skilled in the art will realize that the other mentioned arrangements for converting rotational motion to linear motion may be used in practicing the present invention. Thus, the term "screw threads" is intended to have a broad meaning consistent with the broad meaning of "threaded adjustment member."

In the second embodiment of FIGS. 17-20, screw axis 143 of threaded adjustment member 142 is coaxial with shaft axis 15, and threaded adjustment member 142 is a turnbuckle connected to first locking component by a first set of screw threads 144A and connected to the second locking component 30B by a second set of screw threads 144B. First set of screw threads 144A are opposite-handed relative to second set of screw threads 144B (i.e., if first set 144A is left-handed, then second set 144B is right-handed, and vice versa). When threaded adjustment member 142 is rotated in a first direction, locking components 30A, 30B are simultaneously displaced away from one another along shaft axis 15 for respective meshing engagement with first and second detent subportions 20A, 20B. First and second detent subportions 20A, 20B may have respective external splines 22A, 22B each having alternating teeth and gaps similar to external spline 22 of detent portion 20 described above, and first and second locking components 30A, 30B may have respective external splines 32 meshed with internal spline 18 of structural ground 12, and respective internal splines 34 for meshing with splines 22A and 22B. Alternatively, first and second detent subportions 20A, 20B may be configured to have radial ball-receiving recesses, and first and second locking components 30A, 30B may be configured to act in cooperation with a ball retaining collar to push respective spring-loaded ball arrays radially into engagement with the ball-receiving recesses in a manner analogous to that described above in connection with FIGS. 10-16.

Figure 17:
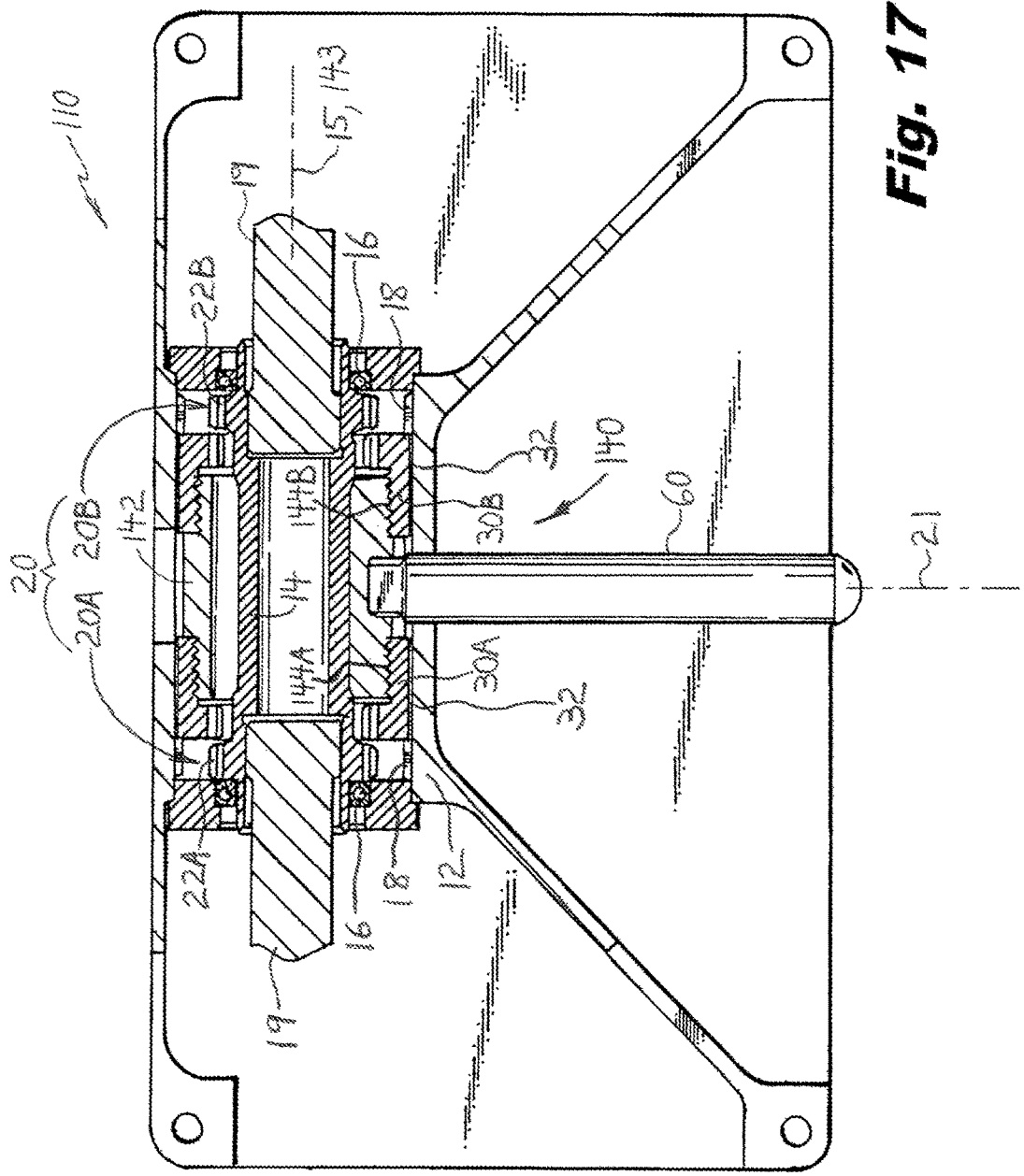
FIG. 17 is a partially sectioned front view of a rotary lock apparatus formed in accordance with a second embodiment of the present invention, wherein the rotary lock apparatus is shown in an unlocked state.
Figure 18:
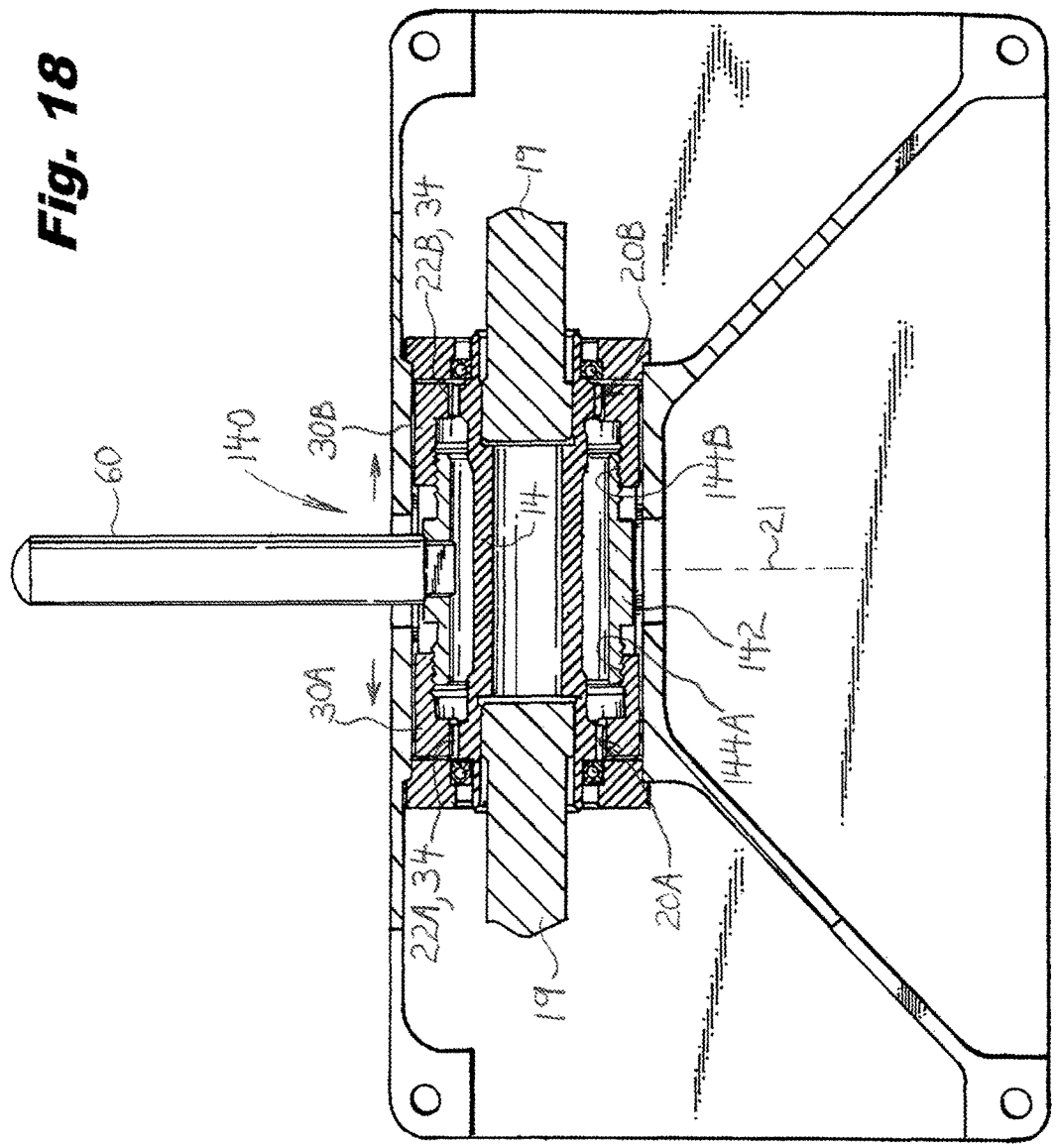
FIG. 18 is a view similar to that of FIG. 17, however the rotary lock apparatus is shown in a locked state.

FIG. 17 depicts rotary lock apparatus 110 in an unlocked condition. FIG. 18 shows rotary lock apparatus 110 in a locked condition resulting from rotation of handle 60 about screw axis 143 and corresponding rotation of threaded adjustment member 142 about the screw axis. Rotation of threaded adjustment member 142, which acts as a turnbuckle, simultaneously displaces first and second locking components 30A, 30B away from one another along shaft axis 15 into meshing engagement with first and second detent subportions 20A, 20B, respectively.

Figure 19:
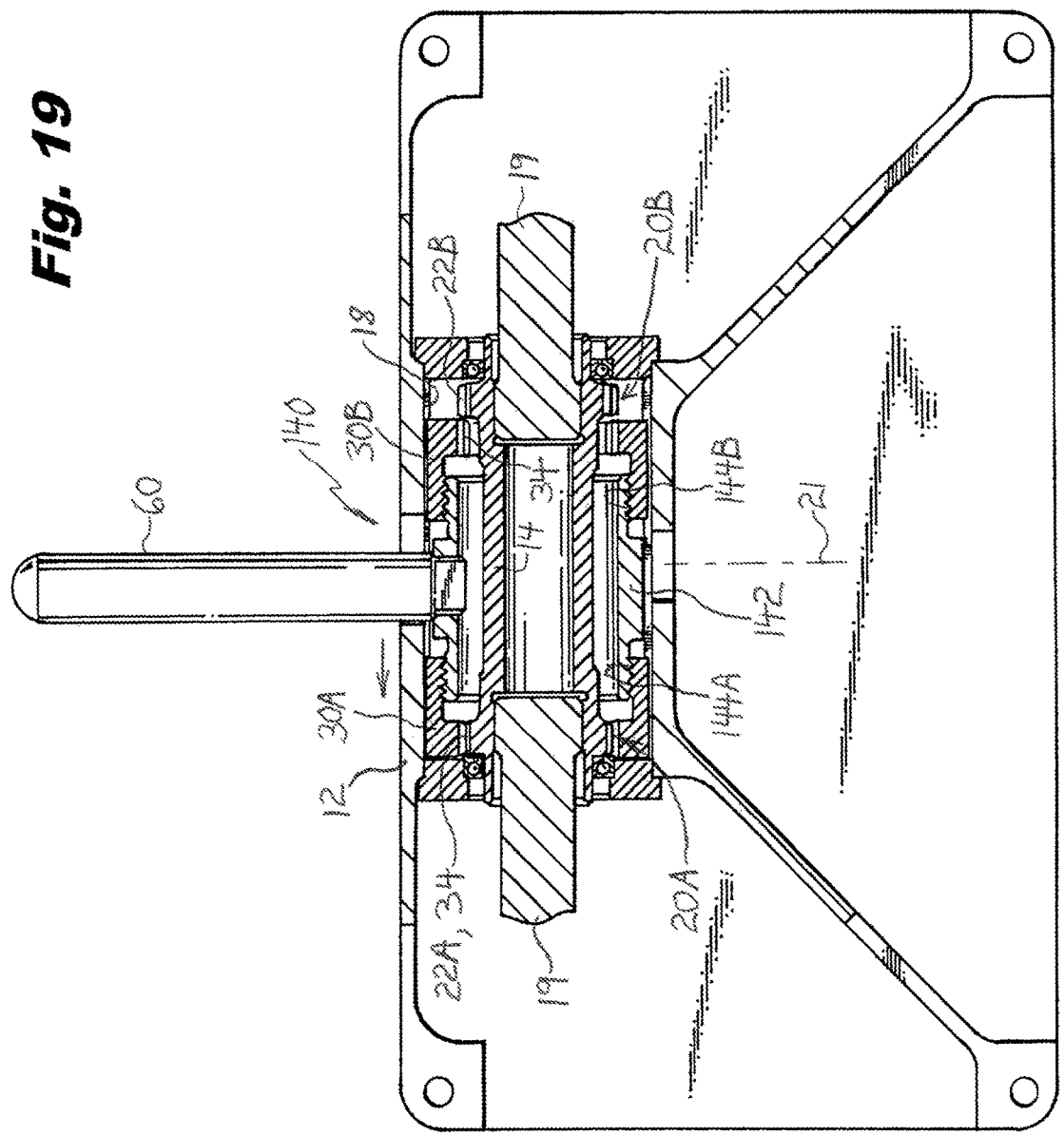
FIG. 19 is a view similar to that of FIG. 17, however the rotary lock apparatus is shown in an alternative locked state.

FIG. 19 depicts a situation in which second locking component 30B is not in proper alignment with second detent subportion 20B and cannot move axially to engage due to abutment. In this situation, rotation of threaded adjustment member 142 causes threaded adjustment member 142 to move to the left in FIG. 19 toward detent subportion 20A. As this occurs, first locking component is also displaced to the left by the action of the first set of screw threads 144A. Consequently, when second locking component 30B is prevented from moving axially, first locking component 30A is displaced along shaft axis 15 by the entire combined displacement distance. As will be understood, when first locking component 30A is prevented from moving axially, second locking component 30B is displaced along shaft axis 15 by the entire combined displacement distance. As in the first embodiment, the engagement structures associated with first and second locking components 30A, 30B may be angularly offset from one another to ensure that at least one of the first and second detent subportions 20A, 20B will always be engaged at any given rotational positon of shaft 14.

Figure 20:
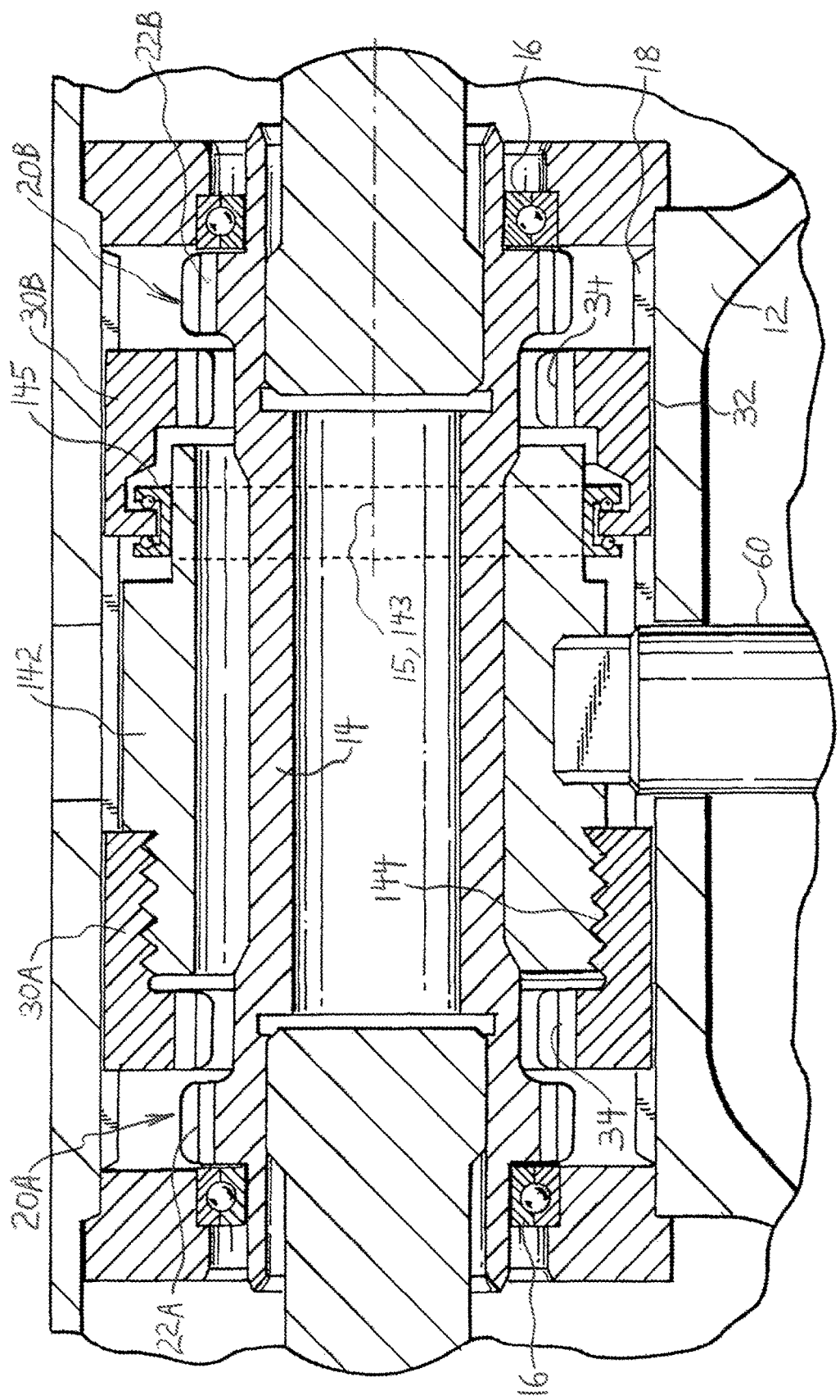
FIG. 20 is an enlarged view of a shaft region of the rotary lock apparatus shown in FIG. 17, wherein an actuating means is modified relative to that shown in FIG. 17.

A modification of the second embodiment is illustrated in FIG. 20, wherein threaded adjustment member 142 is in the form of a jack screw rather than a turnbuckle. More specifically, threaded adjustment member 142 is connected to first locking component 30A by a set of screw threads 144 and is connected to second locking component 30B by a thrust bearing 145 permitting relative rotation between the jack screw (i.e. threaded adjustment member 142) and second locking component 30B while maintaining a fixed axial position of second locking component 30B relative to the jack screw. Rotation of threaded adjustment member 142 in a locking direction about screw axis 143 will displace the locking components 30A, 30B away from one another along shaft axis 15 into respective engagement with first and second detent subportions 20A, 20B. If one of the locking components 30A, 30B cannot engage, the jack screw (i.e. threaded adjustment member 142) shafts axially to increase displacement of the other locking component. In comparison to the turnbuckle version described above, screw threads 144 of the jack screw version may be selected to have fewer teeth-per-inch than screw threads 144A, 144B to compensate for loss of axial displacement per revolution of adjustment member 142 resulting from the use of one set of screw threads rather than two opposite-handed sets of screw threads.

To unlock shaft 14 for rotation, threaded adjustment member 142 can be rotated in an opposite direction about screw axis 143 to axially displace the first and second locking components 30A, 30B out of engagement with detent subportions 20A, 20B, respectively. This manner of unlocking applies to both the turnbuckle version (FIGS. 17-19) and the jack screw version (FIG. 20) of the second embodiment. Rotation of threaded adjustment member 142 may be manually driven using lever 60 as shown in the drawings, or may be automatically driven by a motor connected to the adjustment member by a drive train.

Figure 21:
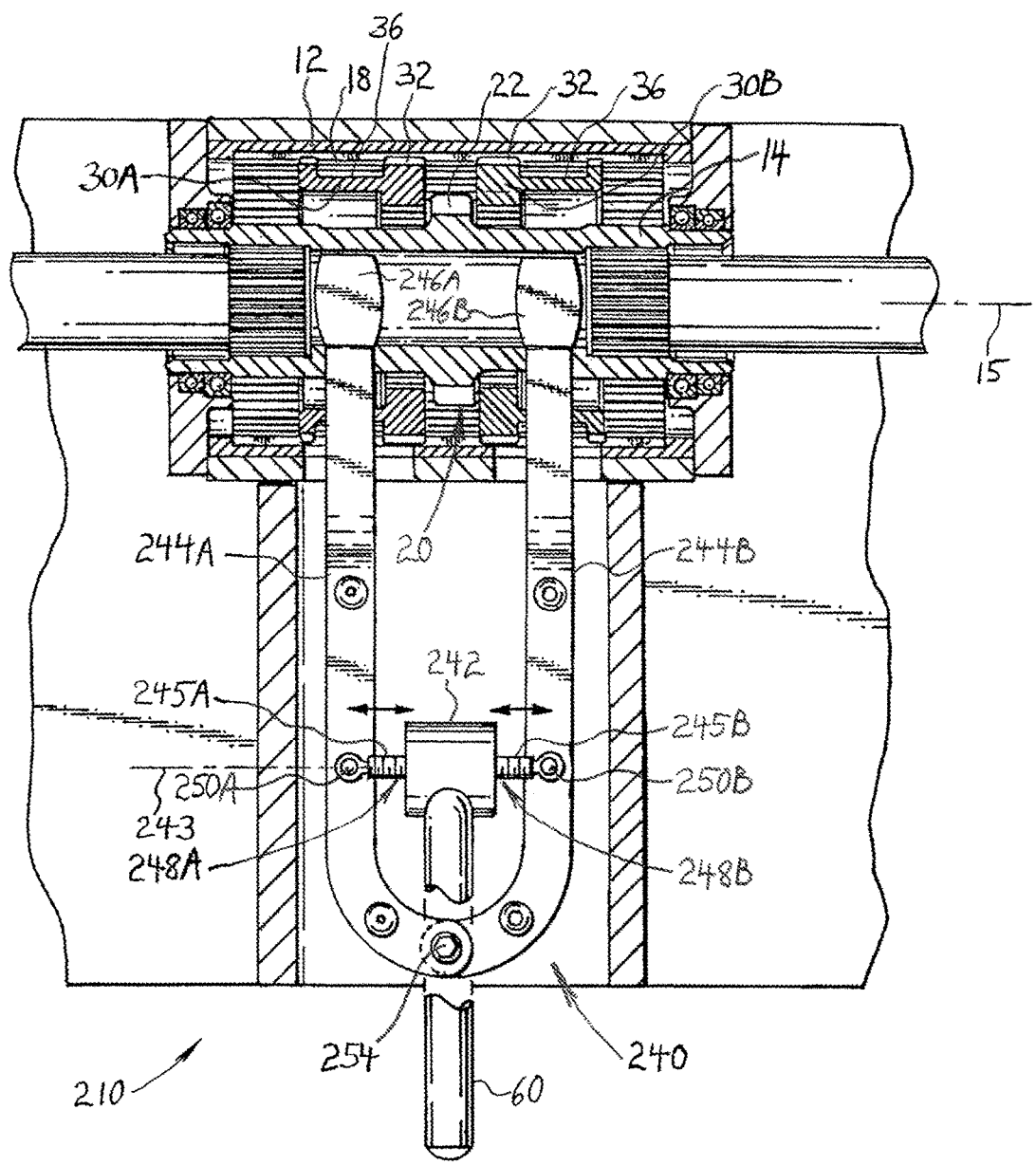
FIG. 21 is a partially sectioned front view of a rotary lock apparatus formed in accordance with a third embodiment of the present invention.

A rotary lock apparatus 210 formed in accordance with a third embodiment of the present invention is illustrated in generally schematic fashion in FIG. 21. Rotary lock apparatus 210 is a hybrid embodiment wherein the actuating means 240 includes a threaded adjustment member 242 in the form of a turnbuckle having a screw axis 243 that is not coaxial with shaft axis 15. Actuating means 240 of the third embodiment further includes first and second displacement arms 244A, 244B engaged by first and second threaded rods 245A, 245B. First rod 245A has one end threadably mated with threaded adjustment member 242 by a first set of screw threads 248A and an opposite end pivotally coupled to first displacement arm 244A at pin 250A. Likewise, and preferably in symmetrical fashion about center line 21, second rod 245B has one end threadably mated with threaded adjustment member 242 by a second set of screw threads 248B and an opposite end pivotally coupled to second displacement arm 244B at pin 250B. First set of screw threads 248A are opposite-handed relative to second set of screw threads 248B (i.e., if first set 248A is left-handed, then second set 248B is right-handed, and vice versa). First displacement arm 244A has an output end 246A coupled to first locking component 30A, and second displacement arm 244B has an output end 246B coupled to the second locking component 30B. For example, as described above in relation to the first embodiment, first locking component 30A and second locking component 30B may each include a respective circumferential groove 36, and the output ends 246A, 246B of the first and second displacement arms 244A, 244B may form a yoke having bifurcated yoke arms terminating in a respective pair of yoke pads slidably retained in circumferential groove 36 of the associated locking component 30A or 30B. First and second displacement arms 244A, 244B may be pivotally coupled to structural ground 12 by a pin 254 spaced away from the output ends 246A, 246B of the displacement arms.

When threaded adjustment member 242 is rotated about screw axis 243, first and second displacement arms 244A, 244B are forced to pivot about a pivot axis defined by pin 254 to displace output ends 246A, 246B. Rotation of threaded adjustment member 242 in one direction brings output ends 246A, 246B toward one another along shaft axis 15 to engage locking components 30A, 30B with detent portion 20, whereas rotation of threaded adjustment member 242 in the opposite direction moves output ends 246A, 246B away from one another along shaft axis 15 to release locking components 30A, 30B from engagement of with detent portion 20. As in the other embodiments, when one of the locking components 30A, 30B cannot move along shaft axis 15 due to misalignment, then the other locking component is moved through the entire combined displacement distance.

Rotary lock apparatus 210 of the third embodiment may be modified in accordance with concepts described herein. For example, detent portion 20 may be discontinuous and have a pair of detent subportions 20A, 20B surrounding locking components 30A, 30B, wherein the locking components 30A, 30B would be moved away from one another along shaft axis 15 to respectively engage detent subportions 20A, 20B. As another example, threaded adjustment member 242 may be a jack screw rather than a turnbuckle.

The present invention, in its various embodiments, provides a mechanism that positively locks a shaft against rotation regardless of the instantaneous rotational position of the shaft, and without introducing any significant transverse loading to the shaft or bearings. While the invention has been described in connection with exemplary embodiments, the detailed description is not intended to limit the scope of the invention to the particular forms set forth. The invention is intended to cover such alternatives, modifications and equivalents of the described embodiment as may be included within the scope of the invention.

What is claimed is:

1. A rotary lock apparatus comprising:
    a structural ground;
    a shaft rotatable about a shaft axis relative to the structural ground, the shaft including a detent portion;
    a first locking component displaceable along the shaft axis to cause the detent portion of the shaft to be engaged and coupled to the structural ground in a manner preventing rotation of the shaft about the shaft axis;
    a second locking component displaceable along the shaft axis to cause the detent portion of the shaft to be engaged and coupled to the structural ground in a manner preventing rotation of the shaft about the shaft axis; and
    an actuating means for displacing the first locking component and the second locking component along the shaft axis in opposite axial directions through a combined displacement distance such that at least one of the first and second locking components positively causes the shaft to be engaged and coupled to the structural ground to thereby lock the shaft against rotation about the shaft axis relative to the structural ground;
    wherein when the first locking component is prevented from causing the detent portion of the shaft to be engaged, the actuating means increases displacement of the second locking component along the shaft axis to achieve the combined displacement distance; and
    wherein when the second locking component is prevented from causing the detent portion of the shaft to be engaged, the actuating means increases displacement of the first locking component to achieve the combined displacement distance.

2. The rotary lock apparatus according to claim 1, wherein the detent portion is an axially continuous portion of the shaft, and the first locking component and the second locking component are arranged on opposite axial sides of the detent portion.

3. The rotary lock apparatus according to claim 1, wherein the detent portion is an axially discontinuous portion of the shaft defining a first detent subportion and a second detent subportion axially spaced apart from the first detent subportion, wherein the first locking component and the second locking component are arranged axially between the first detent subportion and the second detent subportion.

4. The rotary lock apparatus according to claim 1, wherein the actuating means is operable for reversing the displacement of the first locking component and the second locking component such that the detent portion is disengaged and decoupled from the structural ground, whereby the shaft is released to permit rotation of the shaft about the shaft axis relative to the structural ground.

5. The rotary lock apparatus according to claim 1, wherein the actuating means comprises:
    a drive cam rotatable about a cam axis;
    a first displacement arm engaged by the drive cam, the first displacement arm having an output end coupled to the first locking component;
    a second displacement arm engaged by the drive cam, the second displacement arm having an output end coupled to the second locking component; and
    a linkage connecting the first displacement arm and the second displacement arm;
    wherein rotation of the drive cam about the cam axis moves the first and second displacement arms relative to the cam axis, and the linkage causes relative movement between the respective output ends of the first and second displacement arms along the shaft axis.

6. The rotary lock apparatus according to claim 5, wherein:
    each of the first displacement arm and the second displacement arm includes a respective primary travel slot and a respective secondary travel slot, the primary travel slots of the first and second displacement arms extending in a direction perpendicular to the cam axis, and the secondary travel slots of the first and second displacement arms extending in oppositely inclined directions relative to the direction of the primary travel slots; and
    the linkage includes a pivot pin fixed relative to the structural ground and received by the primary travel slot of the first displacement arm and by the primary travel slot of the second displacement arm, a link member pivotable about a pivot axis defined by the link pivot pin, and a follower pin mounted on the link member at a location spaced from the pivot axis and received by the secondary travel slot of the first displacement arm and by the secondary travel slot of the second displacement arm.

7. The locking mechanism according to claim 5, wherein the first locking component and the second locking component each include a respective circumferential groove, the output end of the first displacement arm includes a yoke mating with the circumferential groove of the first locking component, and the output end of the second displacement arm includes another yoke mating with the circumferential groove of the second locking component.

8. The rotary lock apparatus according to claim 1, wherein the actuating means comprises a threaded adjustment member connecting the first locking component and the second locking component, wherein the threaded adjustment member is rotatable about a screw axis in a first rotational direction to displace the first locking component and the second locking component along the shaft axis toward one another, and the threaded adjustment member is rotatable about the screw axis in a second rotational direction opposite the first rotational direction to displace the first locking component and the second locking component along the shaft axis away from one another, and wherein the threaded adjustment member is movable along the screw axis.

9. The rotary lock apparatus according to claim 8, wherein the screw axis is coaxial with the shaft axis.

10. The rotary lock apparatus according to claim 9, wherein the threaded adjustment member is a turnbuckle connected to the first locking component by a first set of screw threads and connected to the second locking component by a second set of screw threads.

11. The rotary lock apparatus according to claim 9, wherein the threaded adjustment member is a jack screw connected to the first locking component by a set of screw threads and connected to the second locking component by a thrust bearing permitting relative rotation between the jack screw and the second locking component and maintaining a fixed axial position of the second locking component relative to the jack screw.

12. The rotary lock apparatus according to claim 8, wherein the actuating means further comprises:
 a first displacement arm having an output end coupled to the first locking component; and
 a second displacement arm having an output end coupled to the second locking component;
 wherein the threaded adjustment member is arranged between and connected to the first and second displacement arms such that rotation of the threaded adjustment member about the screw axis causes the respective output ends of the first and second displacement arms to move along the shaft axis.

13. The rotary lock apparatus according to claim 12, wherein the threaded adjustment member is a turnbuckle connected to the first locking component by a first set of screw threads and connected to the second locking component by a second set of screw threads.

14. The rotary lock apparatus according to claim 12, wherein the threaded adjustment member is a jack screw connected to the first locking component by a set of screw threads and connected to the second locking component by a thrust bearing permitting relative rotation between the jack screw and the second locking component and maintaining a fixed axial position of the second locking component relative to the jack screw.

15. The locking mechanism according to claim 12, wherein the first locking component and the second locking component each include a respective circumferential groove, the output end of the first displacement arm includes a yoke mating with the circumferential groove of the first locking component, and the output end of the second displacement arm includes another yoke mating with the circumferential groove of the second locking component.

16. The rotary lock apparatus according to claim 12, wherein the first displacement arm and the second displacement arm are pivotally coupled to one another at a location spaced from the respective output ends of the first and second displacement arms.

17. The rotary lock apparatus according to claim 1, wherein the structural ground includes an internal spline, and the first locking component and the second locking component each include a respective external spline meshed with the internal spline of the structural ground.

18. The rotary lock apparatus according to claim 13, wherein the detent portion of the shaft includes an external spline, and the first locking component and the second locking component each include a respective internal spline for meshing engagement with the external spline of the detent portion.

19. The rotary lock apparatus according to claim 18, wherein the respective internal splines of the first locking component and the second locking component are angularly offset from one another such that at least one of the respective internal splines of the first locking component and the second locking component is aligned for meshing engagement with the external spline of the detent portion at any given rotational position of the shaft.

20. The rotary lock apparatus according to claim 1, wherein the detent portion of the shaft includes an array of radial ball-receiving recesses, and the rotary lock apparatus further comprises a cylindrical ball collar constrained from rotating about the shaft axis relative to the structural ground, the cylindrical ball collar having a first array of balls contacted by the first locking component and a second array of balls contacted by the second locking component, wherein the balls in the first and second arrays are spring-biased to reside at a resting radius relative to the shaft axis, wherein the displacement of the first locking component along the shaft axis forces the first array of balls radially inward against the spring bias into the ball-receiving-recesses of the detent portion to engage the detent portion, and wherein the displacement of the second locking component along the shaft axis forces the second array of balls radially inward against the spring bias into the ball-receiving-recesses of the detent portion to engage the detent portion.

21. The rotary lock apparatus according to claim 20, wherein the first array of balls and the second array of balls are angularly offset from one another such that at least one of the first and second arrays of balls is aligned for receipt into the ball-receiving recesses of the detent portion at any given rotational position of the shaft.

* * * * *